July 21, 1959 P. BIZOUARD ET AL 2,896,164
DAMPING DEVICE FOR OSCILLATING MEMBERS OF
ELECTRO-MECHANICAL APPARATUS
Filed April 16, 1956

INVENTOR
PAUL BIZOUARD ET AL
BY McKinney & McKinney
ATTYS.

United States Patent Office 2,896,164
Patented July 21, 1959

2,896,164

DAMPING DEVICE FOR OSCILLATING MEMBERS OF ELECTRO-MECHANICAL APPARATUS

Paul Bizouard, Saint-Maurice, and Yvane Hardouin, Montrouge, France, assignors to Compagnie pour la Fabrication des Compteurs et Materiel d'Usines a Gaz, Montrouge, Seine, France, a French joint-stock company Application April 16, 1956, Serial No. 578,334

Claims priority, application France May 14, 1957

1 Claim. (Cl. 324—125)

The present invention relates to a damping device for the oscillating members of electro-mechanical apparatus.

The invention is especially applicable to recording oscillograph devices as exhibited, for example, in R. P. Dubusc U.S. Patent No. 2,673,137 of March 23, 1954, in which it is desirable that the deflection of the moving system of these instruments should reproduce as exactly as possible the electrical quantity which is applied to their input terminals (input signal).

It is known that in these types of instruments, especially when they have a high natural frequency, the curves which represent the amplitudes of the oscillations of the measuring moving system as a function of the frequency of the input potential, and for a constant amplitude of this potential, have a form similar to that which has been shown in Fig. 1. This curve first slopes towards the abscissa, since the impedance of the energising winding of the moving system (or the impedance of the moving frame) increases with frequency, which causes a reduction of the current in the said winding (or the said frame) and in consequence a reduction in the active torque. As the frequency of the input voltage approaches the natural frequency F of the oscillating member, the curve rises sharply and passes through a maximum at a value very close to the natural frequency of the oscillating member, and then again falls away. As a result of the nonhorizontal nature of this response curve, the indications of these instruments are full of errors which depend on the frequency of the electrical quantity applied to their input terminals.

In addition, during the recording of electrical quantities, in the case of a rapidly and transitorily varying quantity, or during the recording of rectangular or steep-front signals, it happens that this recording is not a faithful one, either as a result of parasitic oscillations of the moving system or because of the slowness of deflection of the said moving system.

The object of the present invention is to provide a remedy for these drawbacks and to enable a suitable damping to be provided for the oscillating members of electro-mechanical instruments, and especially the moving systems of oscillographs, in order that, on the one hand, the curve of response as a function of the frequency for a constant amplitude of the potential at the input terminals of these instruments may be horizontal up to the natural frequency of the oscillating members, and that on the other hand, the reproduction of rectangular or steep-front signals may not be distorted.

The invention has for its object a damping device for the oscillating member of an electro-mechanical instrument comprising an exciting winding and an amplifier of the negative feed-back type with two input potentials. The damping device is constituted by a corrector circuit and a rejector circuit parallel tuned to the natural frequency of the oscillating member. The corrector circuit, the rejector circuit and the exciting winding of the oscillating member, connected in series, are connected to the output terminals of the amplifier of which two input potentials are the voltage of the input signal applied to the instrument and the voltage across the terminals of the corrector circuit.

Figure 1:
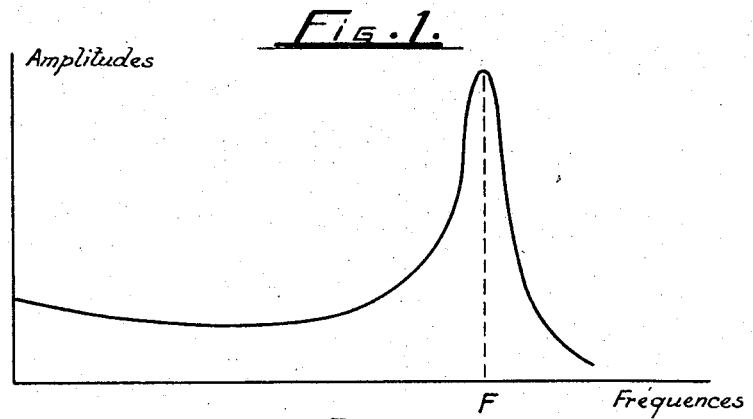
Figure 1 is a diagram showing the frequencies and amplitudes of the system.

The general organization of the wiring diaphragm of an oscillograph is shown at 3; the impedance of the exciting winding is Z. The oscillograph may take various forms and is preferably of a configuration disclosed in U.S. patent to R. P. Dubusc, 2,673,137 of March 23, 1954. It includes a permanent magnet, electro-magnets 8a and 8b, coils 3a and 3d for electro-magnet 8a, coils 3b and 3c for an electro-magnet 8b, an oscillation plate 9, a torsion bar 9a supporting the said plate 9. The magnetic poles of the permanent magnet are indicated by "N," "S" at each side of the electro-magnets 8a and 8b. The coils 3a, 3d, 3b and 3c of the electro-magnets are arranged in series.

Figure 2:
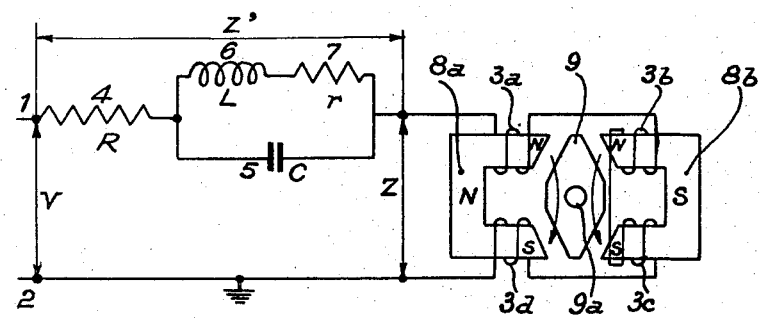
Figs. 2 and 3 show by way of examples and without implied limitation, circuit diagrams of arrangements adapted to attain the object of the invention.

In Fig. 2, the voltage V is applied between the input terminals 1 and 2. The exciting winding of the moving system (or the moving frame) of an oscillograph is shown at 3, the impedance of this winding being Z. The corrector circuit in accordance with the invention comprises a resistance 4 of high value R, in series with a rejector circuit comprising a condenser 5 of capacity C, a coil 6 having an inductance L and a resistance 7 having a value r. This rejector circuit of impedance Z' is tuned substantially to the natural frequency of the oscillating member. The corrector circuit is connected in series with the exciting winding (or the moving frame) of the oscillating member.

Since the resistance 4 has a value R which is very large compared with the impedance Z of 3, the current which passes through 3 remains practically constant for a constant amplitude of the input potential when the frequency of this potential increases, although Z also increases. By virtue of this arrangement, the amplitudes of the deflections of the oscillating member remain constant (for a constant amplitude of the input potential V) for frequencies less than the natural frequency of the oscillating member. In the vicinity of this frequency, the rejector circuit reduces the intensity of the current which passes through 3 in such manner that it eliminates the increase in amplitude of the oscillations of the oscillating member. The corrector circuit in accordance with the invention thus enables deflections of constant amplitude of the oscillating member to be obtained, for a constant input potential V, for frequencies reaching a value at least equal to the natural frequency of the oscillating member.

The corrector circuit also enables a response curve to be obtained which is correct for the recording of transitory phenomena and signals with steep wave-fronts.

As has already been indicated above, the corrector circuit already referred to and the exciting winding (or the moving frame) of the oscillating member may be connected to the output terminals of the amplifier.

Figure 3:
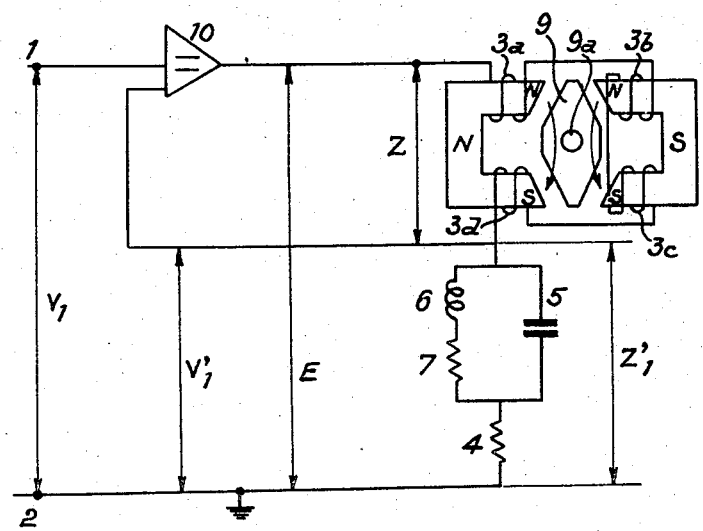

However, in accordance with a further special feature of the invention, the amplifier used is of the negative feedback type, and its second input potential is derived from across the terminals of the corrector circuit. This arrangement of connections is shown in Fig. 3.

In this figure, in which the same reference numbers represent the same parts as in Fig. 2, a negative feedback amplifier is shown at 10, the two input potentials being the voltage $V_1$ at the terminals 1—2 and the voltage $V'_1$ at the terminals of the corrector circuit.

It is known that the output voltage E is given by the equation:

$$E = K(V_1 - V'_1)$$

where K is the amplification factor.

If the output current is represented by $I$, $E=(Z'_1+Z)I$ and $V'_1 = Z'_1.I$ from which $(Z'_1+Z)I = KV_1 - KZ'_1.I$ and $KV_1 = Z'_1(K+1)I + ZI$.

If this last equation is compared with the following equation which can be established from Fig. 2:

$$V = Z'I + ZI$$

it can immediately be seen that the impedance $Z'_1$ of the corrector circuit in accordance with Fig. 3, which will have the same effect as the impedance $Z'$ of the corrector circuit in accordance with Fig. 2 will be $(K+1)$ times smaller than the impedance $Z'$.

By virtue of the arrangement in accordance with Fig. 3, the power absorbed by the corrector circuit is reduced by substantial proportions.

We claim:

In an electro-mechanical instrument comprising an oscillating member, an exciting winding for the said oscillating member and an amplifier of the negative feed-back type with two input potentials, a damping device for the said oscillating member, constituted by a corrector circuit comprising: a resistance; and a rejector circuit parallel tuned to the natural frequency of the oscillating member, the said resistance, the said rejector circuit and the said exciting winding of the oscillating member, connected in series, being connected to the output terminals of the said amplifier, the two said input potentials of the said amplifier being the voltage of the input signal applied to the instrument and the voltage across the terminals of the said corrector circuit.

References Cited in the file of this patent

UNITED STATES PATENTS

| | | |
|---|---|---|
| 1,324,054 | Irwin | Dec. 9, 1919 |
| 1,993,758 | Stillwell | Mar. 12, 1935 |
| 2,067,520 | Curtis et al. | Jan. 12, 1937 |
| 2,351,353 | McCarty | June 13, 1944 |